(12) United States Patent
Lacouture et al.

(10) Patent No.: US 12,498,278 B2
(45) Date of Patent: Dec. 16, 2025

(54) OPEN SYSTEM COLD PLATE DIFFERENTIAL CALORIMETER

(71) Applicant: Texas Tech University System, Lubbock, TX (US)

(72) Inventors: Shelby Lacouture, Lubbock, TX (US); Trevor Dardik, Lubbock, TX (US); Dennis van der Vliet, Skokie, IL (US); Robert Duncan, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 407 days.

(21) Appl. No.: 18/024,223

(22) PCT Filed: Sep. 1, 2021

(86) PCT No.: PCT/US2021/048763
§ 371 (c)(1),
(2) Date: Mar. 1, 2023

(87) PCT Pub. No.: WO2022/051431
PCT Pub. Date: Mar. 10, 2022

(65) Prior Publication Data
US 2023/0296452 A1    Sep. 21, 2023

Related U.S. Application Data

(60) Provisional application No. 63/073,913, filed on Sep. 2, 2020.

(51) Int. Cl.
*G01K 17/00* (2006.01)
*G01K 17/04* (2006.01)
(Continued)

(52) U.S. Cl.
CPC ................... *G01K 17/00* (2013.01)

(58) Field of Classification Search
CPC ........ G01K 17/00; G01K 17/04; G01K 17/02; G01K 17/006; G01K 17/185; G01K 17/08;
(Continued)

(56) References Cited

U.S. PATENT DOCUMENTS 4,178,800 A * 12/1979 Thomann ........... G01N 25/4846
374/33
5,967,659 A * 10/1999 Plotnikov .......... G01N 25/4866
422/51
(Continued)

FOREIGN PATENT DOCUMENTS

JP    2003042985 A    2/2003
JP    4327760 B2 *   9/2009

OTHER PUBLICATIONS

PCT/US2021/048763. International Search Report & Written Opinion (Jun. 2, 2022).
(Continued)

Primary Examiner — Jeffrey P Aiello
(74) Attorney, Agent, or Firm — LOZA & LOZA, LLP; Kevin L. Soules

(57) ABSTRACT

An open calorimetry system comprising an active vessel, a passive vessel, and a first and second heat flux detector in thermal communication with the active vessel and passive vessel respectively. A thermal reservoir is connected to the first heat flux detector and the second heat flux detector, wherein data from the heat flux detectors is used in a differential analysis resulting in an energy measurement of an article in the active vessel.

19 Claims, 10 Drawing Sheets

(51) Int. Cl.
*G01N 25/20* (2006.01)
*G01N 25/48* (2006.01)

(58) Field of Classification Search
CPC ............ G01K 7/42; G01K 1/16; G01K 13/20; G01K 13/00; G01K 2207/08; G06F 17/18; G06F 18/217
USPC ... 374/31, 1, 10, 17.001, 29, 36, 41, 44, 45, 374/30; 702/136, 188, 130, 189, 12, 85
See application file for complete search history.

(56) References Cited

U.S. PATENT DOCUMENTS

| | | | | |
|---|---|---|---|---|
| 6,390,669 | B1 * | 5/2002 | Nakamura | G01N 25/4866 374/10 |
| 8,740,453 | B2 * | 6/2014 | Torniainen | B01L 3/50273 374/31 |
| 9,678,025 | B1 * | 6/2017 | Fesmire | G01N 25/72 |
| 10,094,718 | B2 * | 10/2018 | Wu | G01N 25/4826 |
| 2003/0026319 | A1 * | 2/2003 | Kinoshita | G01N 25/4866 374/33 |
| 2004/0107986 | A1 * | 6/2004 | Neilson | G01K 1/18 136/204 |
| 2005/0163188 | A1 * | 7/2005 | Nishimura | G01N 25/4826 374/10 |

OTHER PUBLICATIONS

Gill et al., Differential Scanning Calorimetry Techniques: Applications in Biology and Nanoscience, Journal of Biomolecular Techniques, Dec. 2010, 167-193, 21, Tehran, Iran.

* cited by examiner

OPEN SYSTEM COLD PLATE DIFFERENTIAL CALORIMETER

CROSS REFERENCE TO RELATED PATENT APPLICATIONS

This application claims the priority and benefit under 35 U.S.C. § 119(e) of U.S. Provisional Patent Application Ser. No. 63/073,913 filed Sep. 2, 2021, entitled "OPEN SYSTEM COLD PLATE DIFFERENTIAL CALORIMETER." U.S. Provisional Patent Application Ser. No. 63/073,913 is herein incorporated by reference in its entirety.

TECHNICAL FIELD

Embodiments are generally related to the field of laboratory instruments. Embodiments are further related to measurement of heat flux. Embodiments are also related to measurement of power. Embodiments are further related to calorimetry apparatuses. Embodiments are further related to methods and apparatuses for open system differential calorimetry.

BACKGROUND

Calorimetry refers generally to the measurement of heat transfer within a calorimetric body. Calorimeters are devices used to measure the heat transfer from systems that are contained inside the calorimetric boundary. Calorimetry is an established science dating back hundreds of years. However, calorimeters remain largely crude instruments, incapable of the precise measurements required in many modern applications.

Most calorimetric systems have historically measured the temperature rise of a substance under test in response to a well-controlled flow of heat into an insulated closed system that contains the substance. This essentially means that the calorimeter does not allow the continuous flow of heat, energy, or mass through the calorimeter volume during the measurement, which constitutes an open system. Closed calorimeter systems are scientifically useful for the static measurement of the heat capacity, or thermal properties of the substance within the closed system, such as the heat liberated during a chemical reaction that is contained within the closed system. Such closed systems are often referred to as "bomb" type calorimeters, and are commercially available. These "bomb" type calorimeters use a constant-volume chamber that are typically used to measure heat generated from a chemical reaction. These calorimeters can provide very accurate measurements of enthalpies of chemical reactions, but they suffer from a number of draw backs since they cannot measure the change in dissipation in complex, dynamical (open) systems.

For example, in cases where changes in power and heat liberation need to be measured, and the system is intrinsically open, meaning heat, power, (or more generally mass) may enter or leave the system continuously during the measurements, or the experiment requires large, and/or odd shaped samples to be measured, current systems are unfit. As a result, bomb calorimeters are not practical for many applications. In addition, bomb calorimeters require complex and custom built equipment that can be very expensive. Acquiring a bomb calorimeter is cost prohibitive for many laboratories where heat measurements may be an integral component of their research.

Thus, while there are several types of Calorimeters available commercially, current solutions are generally designed to measure heat flux, power, or thermal properties of a substance from a closed system, i.e., systems where there is no continuous exchange of heat flux, power, or mass with the environment outside of the calorimeter Accordingly, there is a need for systems and methods that can be used to provide open system calorimetric measurements, that are both accurate and cost effective. Such systems, methods, and apparatuses are disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide laboratory equipment.

It is another aspect of the disclosed embodiments to provide systems and apparatuses for calorimetry.

It is another aspect of the disclosed embodiments to provide methods and systems for measuring heat.

It is another aspect of the disclosed embodiments to provide methods, systems, and apparatuses for measuring energy and/or power using differential calorimeters.

It is another aspect of the disclosed embodiments to provide an open system calorimeter that operates in an open environment to measure endothermic or exothermic events in a system subjected to a steady heat flux.

It is another aspect of the disclosed embodiments to provide open system cold plate differential calorimeters.

It will be appreciated that the methods and systems can be achieved according to the embodiments disclosed herein. For example, in certain embodiments systems and methods are disclosed for measurement of heat (Q) and power (W) from a substance that may exchange mass or heat with the environment. In such embodiments, a test object (e.g. a device, substance, etc.) can be placed in a container that allows mass or heat/power to enter and leave. This might include, for example, an experiment where electrical power enters the test object, and measurement of total heat is desired, including that evolved by the substance. The present embodiments utilize a solid-state thermoelectric unit to act as a very precisely electronically controlled heat reservoir. Differential calorimetry can be used to cancel environmental temperature changes via common mode rejection (CMR). Heat flux is measured by calibrated thermal flux sensors.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
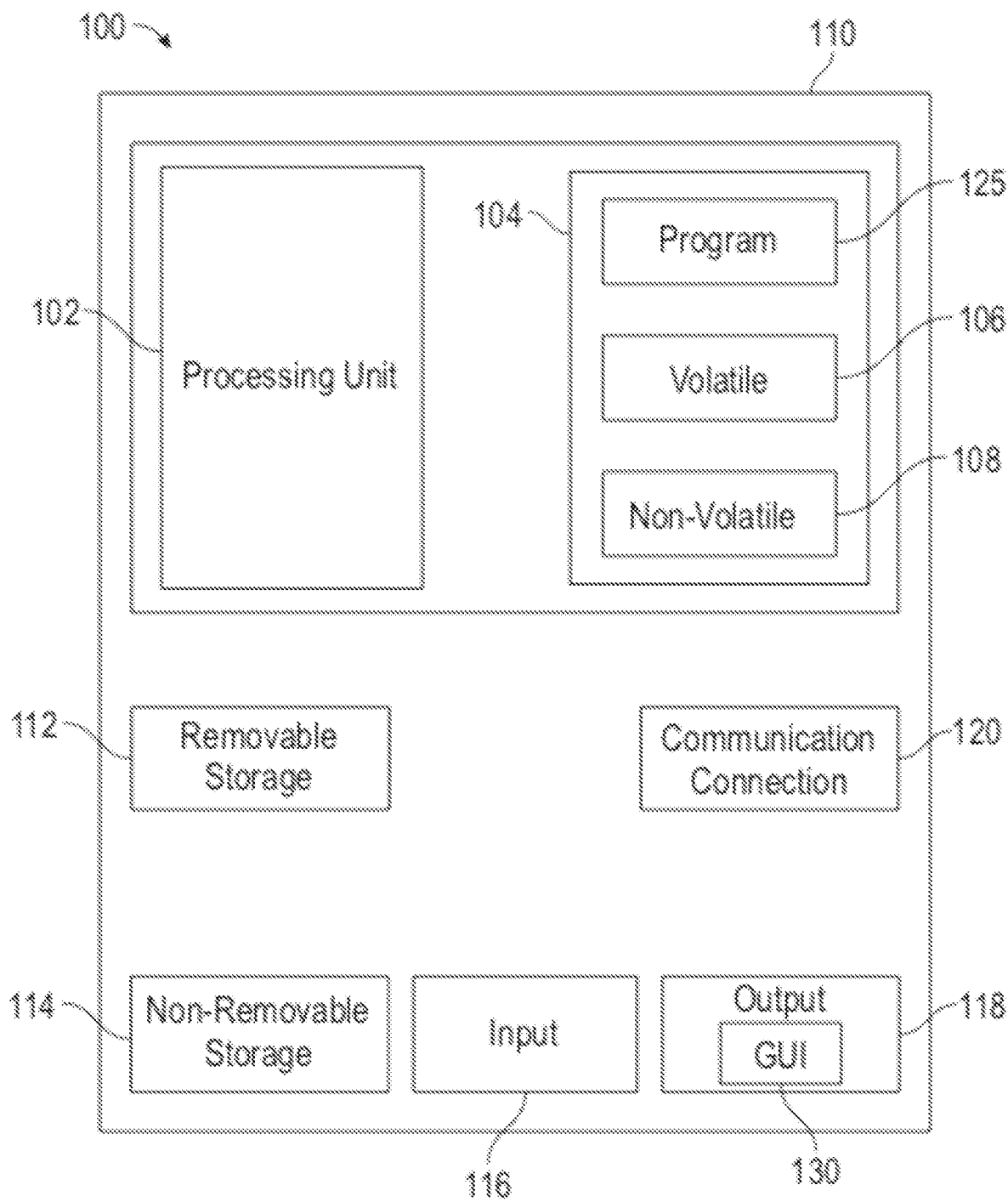
FIG. 1 depicts a block diagram of a computer system which is implemented in accordance with the disclosed embodiments.

Embodiments and aspects of the disclosed technology are presented herein. The particular embodiments and configurations discussed in the following non-limiting examples can be varied, and are provided to illustrate one or more embodiments, and are not intended to limit the scope thereof.

Reference to the accompanying drawings, in which illustrative embodiments are shown are provided herein. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
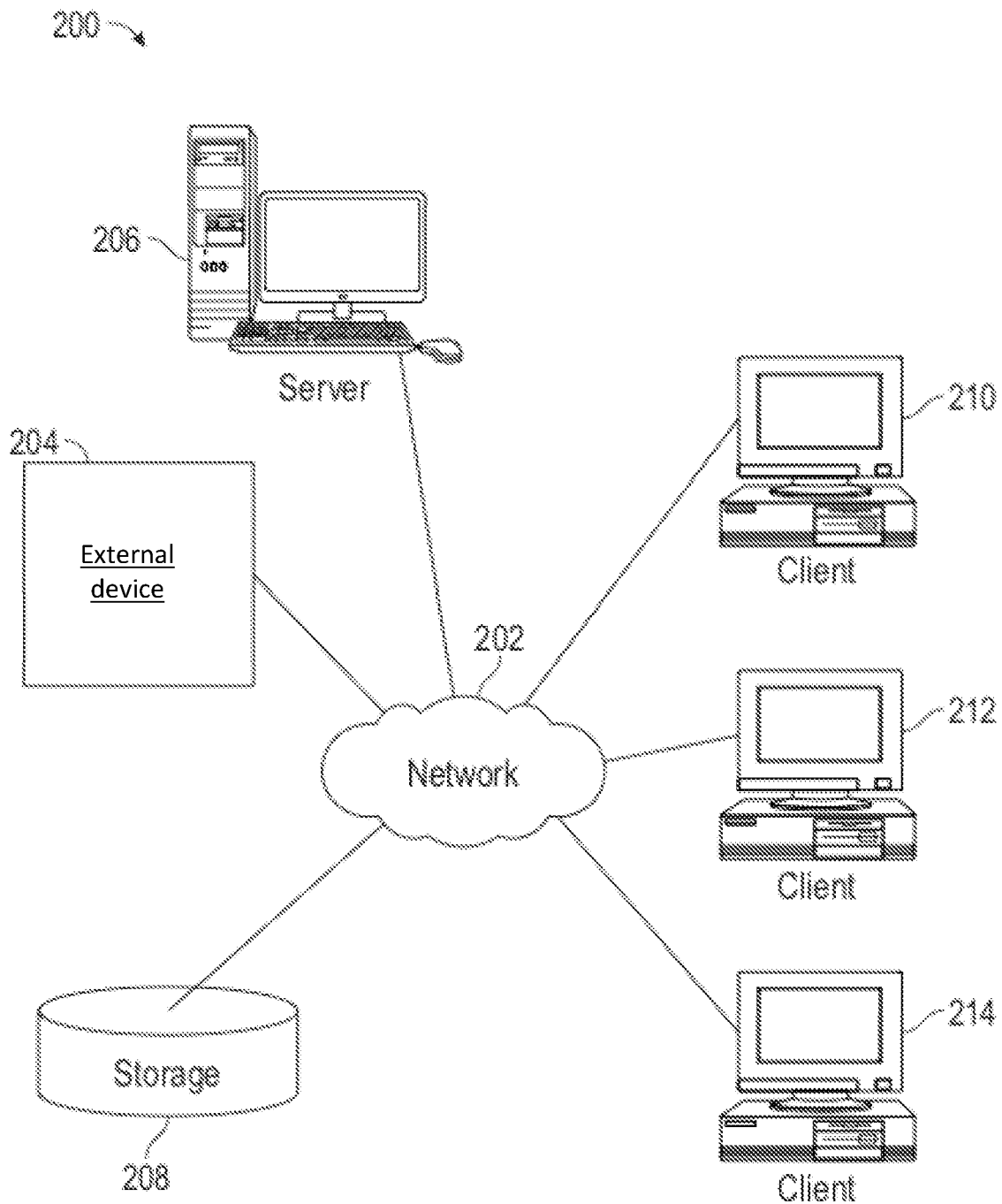
FIG. 2 depicts a graphical representation of a network of data-processing devices in which aspects of the present embodiments may be implemented.
Figure 3:
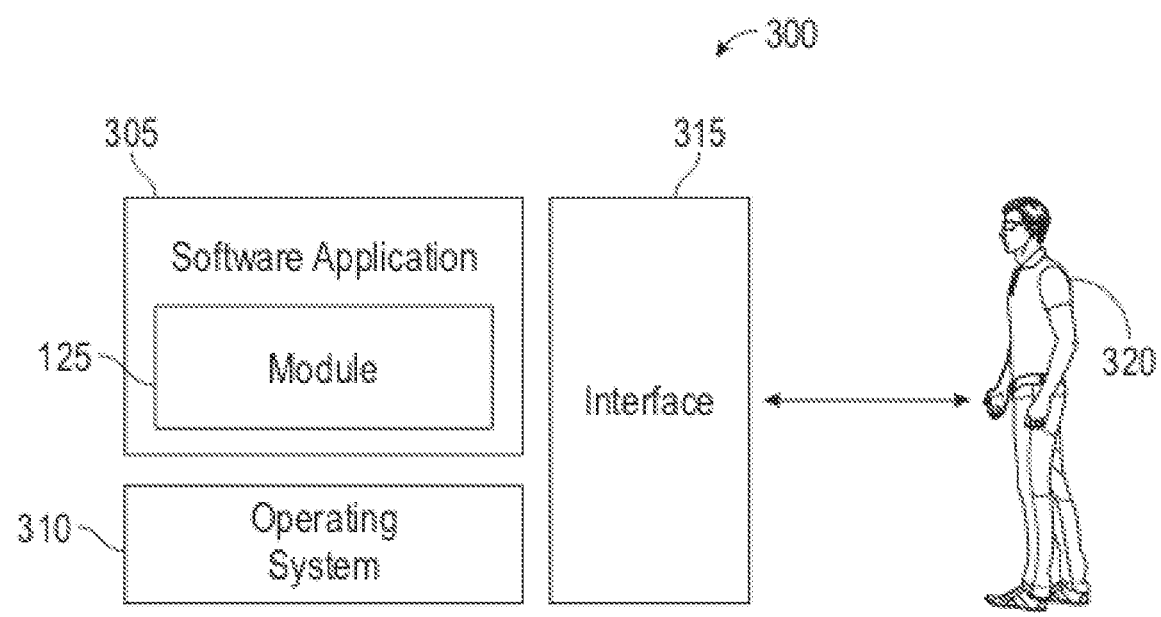
FIG. 3 depicts a computer software system for directing the operation of the data-processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is provided in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to input instructions to computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, actuators, speakers, "internet of things" devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, driver, signal generator, testing apparatus, or other such device.

In the depicted example, device 204, server 206, and clients 210, 212, and 214 connect to network 202 along with storage unit 208. Clients 210, 212, and 214 may be, for example, personal computers or network computers, handheld devices, mobile devices, tablet devices, smart phones, personal digital assistants, controllers, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, LabView and the like. Therefore, the descriptions of the exemplary embodiments, which follow, are for purposes of illustration and not considered a limitation.

The embodiments disclosed herein are directed to calorimeter devices used to measure heat, energy, and/or power. In an exemplary embodiment, a differential calorimeter can comprise an active vessel and passive vessel. Each of the active and passive vessels are connected to a heat flux detector via a conductor. A thermal reservoir is connected to the heat flux detectors. The heat flux between the active vessel and the thermal reservoir is measured by one heat flux detector and heat flux between the passive vessel and the thermal reservoir is measured by the other heat flux detector. A differential analysis (common mode rejection) can then be used to compare the heat flux associated with the active vessel to that of the passive vessel. The resulting measurements can then be used to accurately measure the energy or power of the test object in the active vessel.

Figure 4:
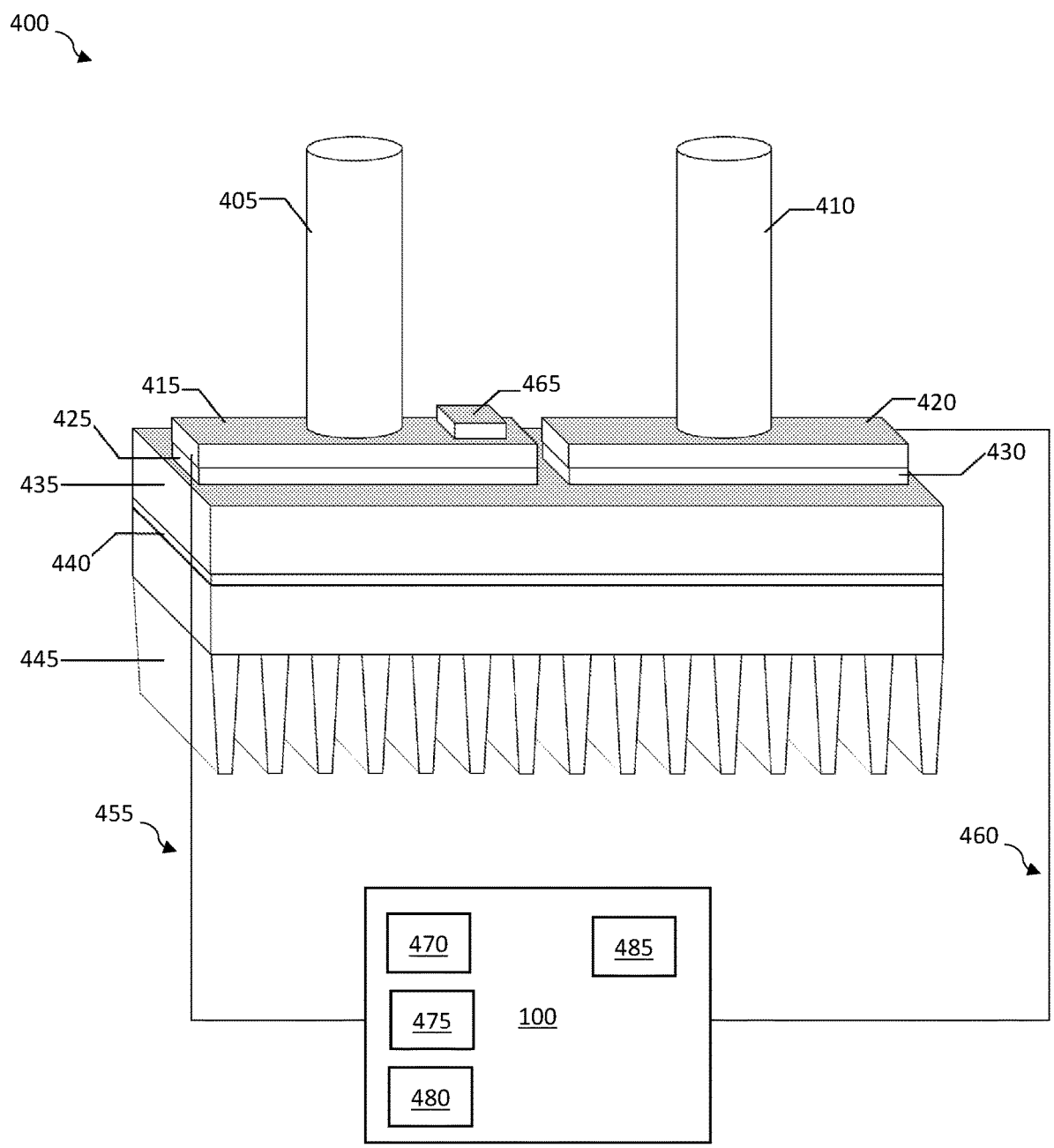
FIG. 4 depicts an open calorimeter system, in accordance with the disclosed embodiments.

FIG. 4 illustrates a calorimeter system 400 in accordance with the disclosed embodiments. The system 400 uses two heat-conducting vessels, active vessel 405 and passive vessel 410. Each of vessel 405 and vessel 410 can be made of a material with very low total thermal resistance. The vessel 405 and vessel 410 can also be configured to be adaptable to be appropriate to the test object (i.e. they can be an arbitrary shape and size). A heating element 465 can be attached to the active vessel 405 and can be used to calibrate for losses to the environment from the active vessel 405.

The vessels can be enclosed or left open (as in the drawing) to allow the vessels to contain a reactor chamber and passive replication in thereof that exceeds the dimensions of the active/passive vessels.

The test object can comprise any number of electrical or physical devices, or chemical substances, upon which a measurement is to be taken. The test object can be placed in the active vessel 405. An equal amount of a substance, or commensurate device that closely matches the thermal properties of the test object, is placed in the passive vessel 410. The active vessel 405 and passive vessel 410 are cornerstones of the disclosed embodiments, as they are necessary for the differential analysis (common mode rejection), used to arrive at the ultimate measurements.

Heat passes from each of active vessel 405 and passive vessel 410 through an associated thermally conductive plate. Thermally conductive plate 415 is in thermal communication with active vessel 405, and thermally conductive plate 420 is in thermal communication with passive vessel 410. The thermally conductive plates 415 and 420 are configured to be identical, or as near as possible to identical, in their characteristic thermal resistance. The materials can also be selected to have low thermal resistance so that the heat from the respective active vessel 405 and passive vessel 410 is transferred to a heat flux sensor. Thus, the thermally conductive plate 415 serves as the interface between active vessel 405 and heat flux sensor 425. Likewise, thermally conductive plate 420 serves as the interface between passive vessel 410 and heat flux sensor 430.

In certain embodiments, the thermally conductive plate and flux sensors can be shrouded in material of low thermal conduction to suppress convective interference on common mode rejection and non-linear heat loss from the active vessel. The calorimeter can use bored-through foam to surround each vessel independently right to the cold plate Each of heat flux sensor 425 and heat flux sensor 430 are thermally bound to an actively heated/cooled thermal reservoir 450. The thermal reservoir can include a cold plate 435, thermoelectric module 440, and heat sink 445. The cold plate 435 can comprise a Proportional-Integral-Differential (PID) controlled cold plate. The cold plate 435 acts as an infinite heat reservoir. The cold plate 435 can be heated/cooled by a thermoelectric module 440. The thermoelectric module 440 can comprise a Peltier module or other such device. Heat pumped from the cold plate 435 via the thermoelectric module 440 is passed to a heat sink 445. The heat sink 445 can be cooled via forced convection, or other such means.

The system further includes a computer system such as computer system 100. The signal 450 produced by the active heat flux sensor 425 is subtracted from the passive signal 455 from the passive heat flux sensor 430. The computer system can then be used to generate a differential signal with common mode rejection as further detailed herein. As such, the calorimeter system 400 provides energy and power measurements from an 'open' system, where heat can enter and leave the calorimetric boundary in a well-controlled manner. The system 400 utilizes a solid state heating and cooling assembly that acts as an electronic heat reservoir. The system 400 is capable of measuring power levels from a few milliwatts to several watts, and is designed and optimized to be nearly immune to variations in ambient temperature and room airflow.

Figure 5:
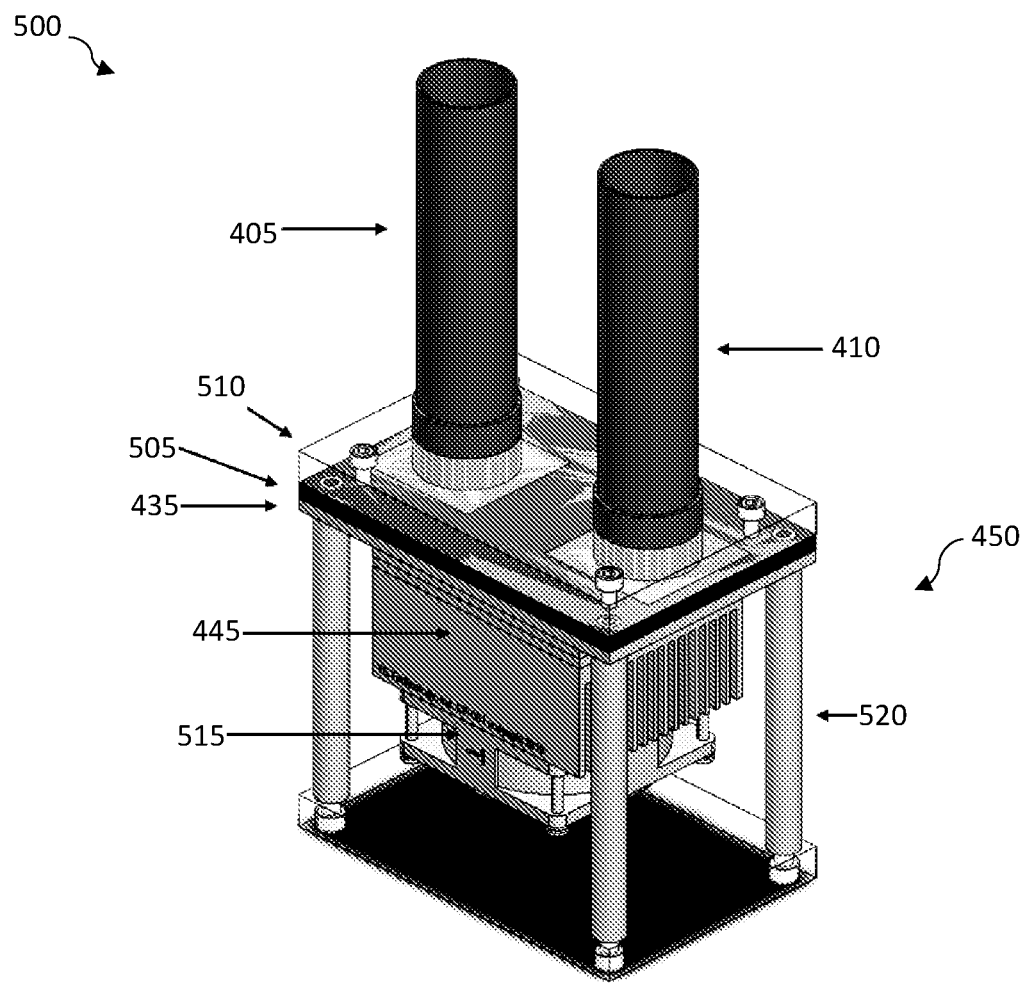
FIG. 5 depicts an open calorimeter system, in accordance with the disclosed embodiments.

FIG. 5 illustrates another embodiment of an open differential calorimeter system 500. The open differential calorimeter system 500 has two containers of arbitrary shape (the illustrated containers are cylindrical but other shaped containers can also be used). These containers are active vessel 405 and passive vessel 410.

The vessels 405 and 410 are mounted to individual heat sensors 415 and 420 respectively. The engagement between the vessels and the respective heat flux sensors is engineered to ensure good thermal contact between the bottom of the vessel and the top of their respective heat flux sensors (not visible in FIG. 5).

In certain embodiments the assembly comprises polycarbonate cut to spec and torqued into place whereby the screws enter tapped threads on the cold plate to secure the polycarbonate in place (exactly as you see in the drawing). However, the polycarbonate sheet can be separated (not in the drawing) to eliminate transfer between active and passive chambers The heat flux sensors can more generally comprise heat flux detectors. In certain embodiments, heat flux detectors can be configured as a Peltier arrays, a calibrated heat flux sensor, a simple thermally resistive material with the temperature difference across this thin layer of thermally resistive material being proportional to the heat flux, a thermal break, a polimeter, or a fiber optic temperature sensor.

In certain embodiments, an insulator 505 can surround the thermally conductive plate 415 and thermally conductive plate 420 to reduce energy loss to the surrounding environment. In addition, a case 510 can be configured around the top surface of the assembly to prevent convective heat transfer to or from the instrumentation used to measure heat flux. The case 510 can comprise, for example, a Plexiglas case, or other such case, that can prevent convective heat transfer.

The bottom side of both heat flux detector 425 and heat flux detector 430 can be in thermal communication, and preferably mounted to, an electronically controlled thermal reservoir 450. The cold plate 435 is the direct interface between the heat flux detectors and the thermal reservoir 450. A thermoelectric module is then used to very precisely control the temperature of the cold plate using a heatsink 445. The heatsink 445 can comprise a Peltier module or other such system. In certain embodiments, a fan 515 can be used to control the temperature of the heatsink 445.

The entire system 500 can be configured with insulating standoffs 520 which serve to further thermally isolate the system 500 from the underlying surface the system 500 is placed on. In certain embodiments, the thermal standoff comprises two foam blocks with bored-through cylinders that shroud each chamber and over the cold plate. The purpose is to place a material with slow thermal transfer over the chambers to remove environmental as well as active chamber convective interference.

An object of interest, where heat or power output is to be measured, can be placed in the active vessel, while the passive (or reference) vessel is filled with a substance/material that approximately mimics the heat capacity and thermal resistance of the active experiment.

The system 500 provides precision measurements because common environmental or instrumental fluctuations register on both the active vessel 405 and the passive or reference vessel 410. However, proper sensitivity balance is required so that spurious fluctuations can be cancelled by rejecting the common mode.

In certain embodiments disclosed herein the heat flux detectors comprise heat flux sensors, a voltage output is generated by the heat flux sensor that is linearly proportional to the difference in temperature across its plates ($\Delta T$). The difference between the active and passive heat flux sensors is obtained and scaled to produce a signal that is proportional to the power evolved in the active vessel. The use of a passive vessel with similar thermal characteristics to the active vessel allows the subtraction of ambient temperature perturbations; in effect giving the system Common Mode Rejection (CMR). This CMR can be further enhanced by a symmetry factor acquired during initial calibration of the calorimeter as further detailed herein.

Put another way, the passive signal is subtracted from the active signal. The "balancing factor," wherein a data acquired from both passive and active arrays without power input to the active chamber improves CMR, as this accounts for differences in thermal conductivity between chambers and persistent atmospheric perturbations that may occur on one side of the device and not the other The cold-plate 440 acts as a uniform and stable, variable-set-point temperature reference in the thermal reservoir 450. The thermal reservoir 450 can be configured to sink or source heat without changes to the temperature of the cold-plate 440. In certain embodiments, the thermal reservoir 450 can make use of Peltier modules with one side attached to the cold-plate 440, and the other to a heatsink 445/fan 515. The thermal reservoir 450 is capable of heating and cooling by operating the Peltier in a bipolar manner, and can be configured to provide $\pm 0.01°$ C. stability in the temperature of the cold plate 440.

A variety of technologies can be used to serve as the heat flux detectors disclosed herein, which are used to measure heat flux (Q). In one embodiment Peltier modules can be used. Peltier modules operate according to the so-called Peltier Effect. Peltier modules take advantage of the fact that the entropy of charge carriers change as they flow across a junction of dissimilar metals. This produces a heat flux that is proportional to the electrical current over a wide operational range. Given the resistivity of the electrically conducting materials, this electrical current produces a voltage variation across the junction that is proportional to the heat flux through the junction. Peltier elements, can incorporate many junctions in parallel across the area of interest where the heat flux is to be measured.

In certain embodiments, the heat flux detectors 425 and 430 can comprise heat flux sensors, or thermopiles. Thermopiles take advantage of the thermoelectric effect by converting thermal energy into current that can be measured. They operate by outputting a voltage that is characteristic of the temperature differential from their junction point to the point where the output voltage is measured. In additional embodiments, simple thermal breaks can be used as the heat flux detectors.

In another embodiment the heat flux detector can comprise a fiber optic temperature sensor. The optical sensor can detect light emission as a function of energy input.

In certain embodiments, the heat flux sensors 425 and 430 can be designed to compensate for limitations intrinsic to Peltier junction arrays. These sensors can optimally exhibit nominal sensitivities of up to ~160 µVm2/W.

Data from the heat flux detectors can be collected with a computer system as illustrated in FIGS. 1-3. In certain embodiments, the computer system can include a data acquisition module 470. The data acquisition module 470 can include 20-Channel multiplexer card used to capture all signals from the calorimeter. Associated software modules including a calibration module 475, analysis module 480 and output module 485 can be used to interface with the data acquisition module 470 and display results via a Graphical User Interface (GUI) 130.

In further embodiments the data acquisition can either be external as in the units in use at CEES, which are Agilent multiplexers, or can be designed into the Calorimeter itself. The function of this hardware is to record the waveforms from the flux sensors. A computer receives the data and processes it. During the calibration process, a symmetry factor and scaling factor are calculated. If calibration coefficients and a symmetry factor have already been acquired, the energy or power calculated can be displayed in real-time.

Explicit calibration and correction factors can be computed with the calibration module 475, to improve the accuracy and precision of the systems disclosed herein. The thermal relationship underpinning the physical phenomenon being measured by can be compactly represented by Fourier's law of heat conduction as presented in equation (1) as follows:

$$Q\text{cond} = -kA\, dT/dx \tag{1}$$

Where k is the thermal conductivity and A is the area normal to the direction of the heat flow. The heat flow is a constant, making the temperature gradient also constant. This leads to a simple relationship between the heat flow through a piece of material, the temperature difference developed across it, and the physical dimensions of the material.

The thermal conductivity, depends on the material and the physical geometry through which heat conduction takes place. A similar thermal relationship exists for both convection and radiation of heat from the surface of a material, for which only the surface area of the material affects the equivalent lumped thermal transfer of a given shape.

To arrive at the desired corrections for the calorimeter system 400, the calorimeter itself can be broken into segments that are approximately delineated by isotherms where heat flow can be considered one-dimensional. This method is intended to observe system response to altered parameters and external perturbations but better absolute accuracy can be obtained by increasing the number of elements corresponding to each physical segment.

In certain aspects, use of an active cold-plate as a heat reservoir and a stable reference will improve the accuracy of the calorimeter. However, another source of error in such an open system, can result from any asymmetry in the heat conduction and convection paths between the active vessel and the passive vessel to ambient temperature. In particular mismatched thermal paths introduce errors and cause a reduction in the differential CMR by altering the systems' symmetry.

In order to reject the common mode signal (ambient temperature in this case) the ratios of each branch's thermal paths must be equal. This is expressed in equation (2) as follows:

$$R_{sense\_act} = R_{sense\_pass} R_{sense\_act} + R_{loss\_act} R_{sense\_pass} + R_{loss\_pass} \tag{2}$$

While it would be a physical impossibility to "trim" the thermal conduction and convection resistances, and perfectly match each flux sensor's sensitivity, a mathematical correction can be applied to the signal to regain good CMR in post-processing of the data with the calibration module 475. A simple reading of each sensor is taken with no applied input power and the ratio of average Vactive to average Vpassive is obtained. This correction factor is used to mathematically bring the system back into 'balance'. The form of the corrected measured power signal is then given by equation (3) as:

$$Q = C(V - \lambda V) \tag{3}$$

Where λ is the dimensionless, empirically acquired correction factor, and C is a scaling factor in units of W/V. The asymmetry caused by larger convecting surfaces in the passive container leads to the ambient temperature perturbations coupling into the measured output signal. The correction factor mathematically restores the ratios of the thermal conductance paths and restores the calorimeter's CMR with the use of a simple initial measurement, and a slightly altered Qmeasured calculation done with the calibration module 475. The symmetry factor is very effective. In particular, the symmetry factor can be introduced in the calibration sequence (input power stepping).

While heat conduction is a relatively weak function of temperature, convection is a strong function of temperature, and the air flow impinging upon the surface through convection is unpredictable. The local temperature of the heatsink is a function of heat flow, ambient temperature, and spatial position. This leads to varying heat flow to ambient through the heatsink at different points on the surface that cannot be accounted for in a scaling factor due to this unpredictable convective non-linearity. Changes in the convection of the heatsink alter the thermal symmetry of the system at different average temperatures. Thus, in the disclosed embodiments a cold plate can be used. The active cold-plate calorimeter output is unperturbed by fluctuations in ambient temperature.

Figure 6:
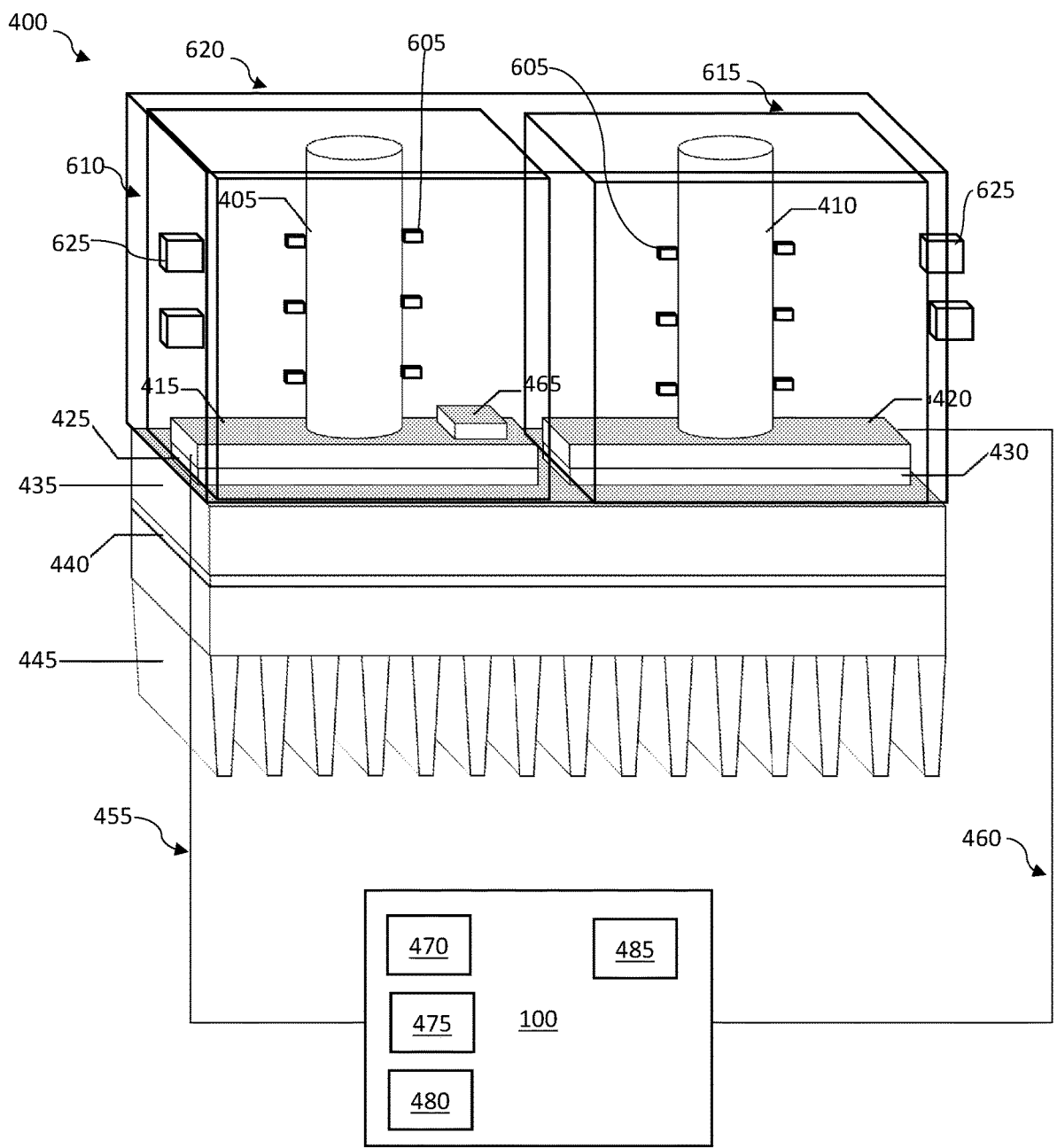
FIG. 6 depicts an open calorimeter system, in accordance with the disclosed embodiments.

FIG. 6 illustrates another embodiment of a calorimeter system 600 in accordance with the disclosed embodiments.

Various aspects of this system 600 are the same as those illustrated in FIGS. 4 and 5. However, the system 600 can include a series of resistive elements 605 which can be attached to the active vessel 405 and passive vessel 410. The resistive elements 605 can be configured to observe shifts out of balance. By moving the resistance in steps, it is possible to see the degree to which rebalancing is required. Thus, the resistors can be used for balancing in the disclosed calibration of the system 600.

The system 600 can further include an isothermal base plate 610 covering active vessel 405 and an isothermal base plate 615 covering passive vessel 410. The isothermal base plates serve to further thermally isolate the vessels to improve the accuracy of the system 600. The isothermal base plates can comprise metal base plates or other such covers.

In addition, an insulating cover 620 can be configured to fit over the vessels to prevent undesirable heat transfer through the vessels that does not occur through the interface with the heat flux sensors. Sensors 625 can optionally be provided along the isotherm to measure and correct for heat transfer that is occurring at other locations within the vessel.

It should be noted that the isothermal plate extensions can be customized to fit the active/passive vessels. Subsequently, a single, customized flux array can line the inside of the isotherm extension to improve flux measurement, or a series of flux sensors can be placed inside wherein it is necessary to individually calibrate the sensors with the resistive elements to accounts for phase shifts in heat dissipation. Again, the isotherm extensions can be left open to fit reactor chambers that exceed the dimensions of the active/passive vessels, or it can be closed small feedthroughs meant for energy/mass flow.

Figure 7:
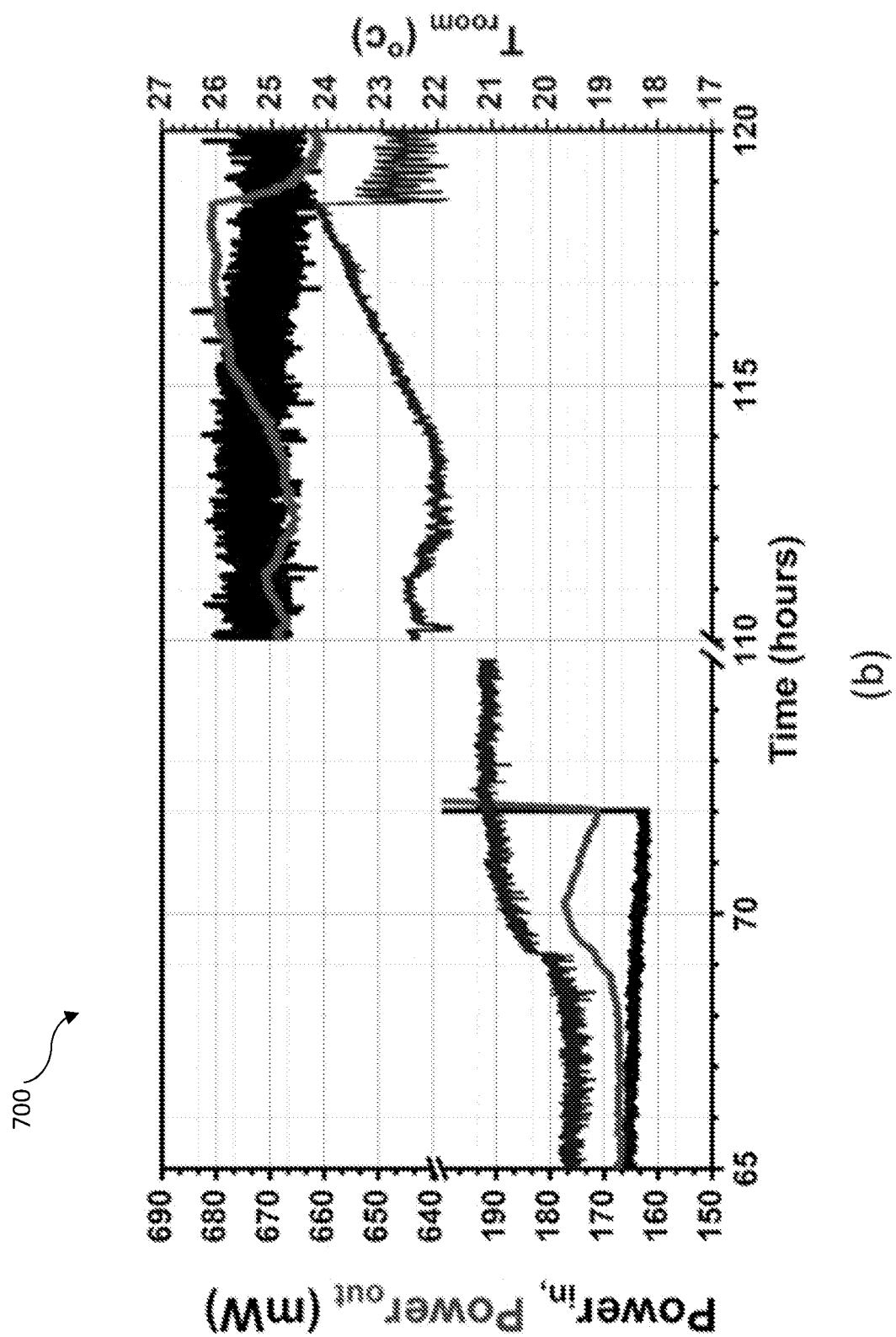
FIG. 7 depicts of sensor data from an open calorimeter system, in accordance with the disclosed embodiments.

FIG. 7 provides an exemplary display 700 associated with the disclosed calorimeter system 400, system 500, or system 600. The measured output power closely follows the ambient temperature variations (blue graph) once the heatsink warms up enough to appreciably alter the convection and ultimately conduction from sensing element to ambient.

Another issue addressed by the active cold plate is the propensity for heat to flow from the active to the passive cell through the heatsink. This effect can be minimized using an active cold plate. This improvement, coupled with the symmetry factor can effectively eliminate the aforementioned errors, producing a calorimeter system 400 that is highly accurate, even in poorly controlled environments.

Figure 8:
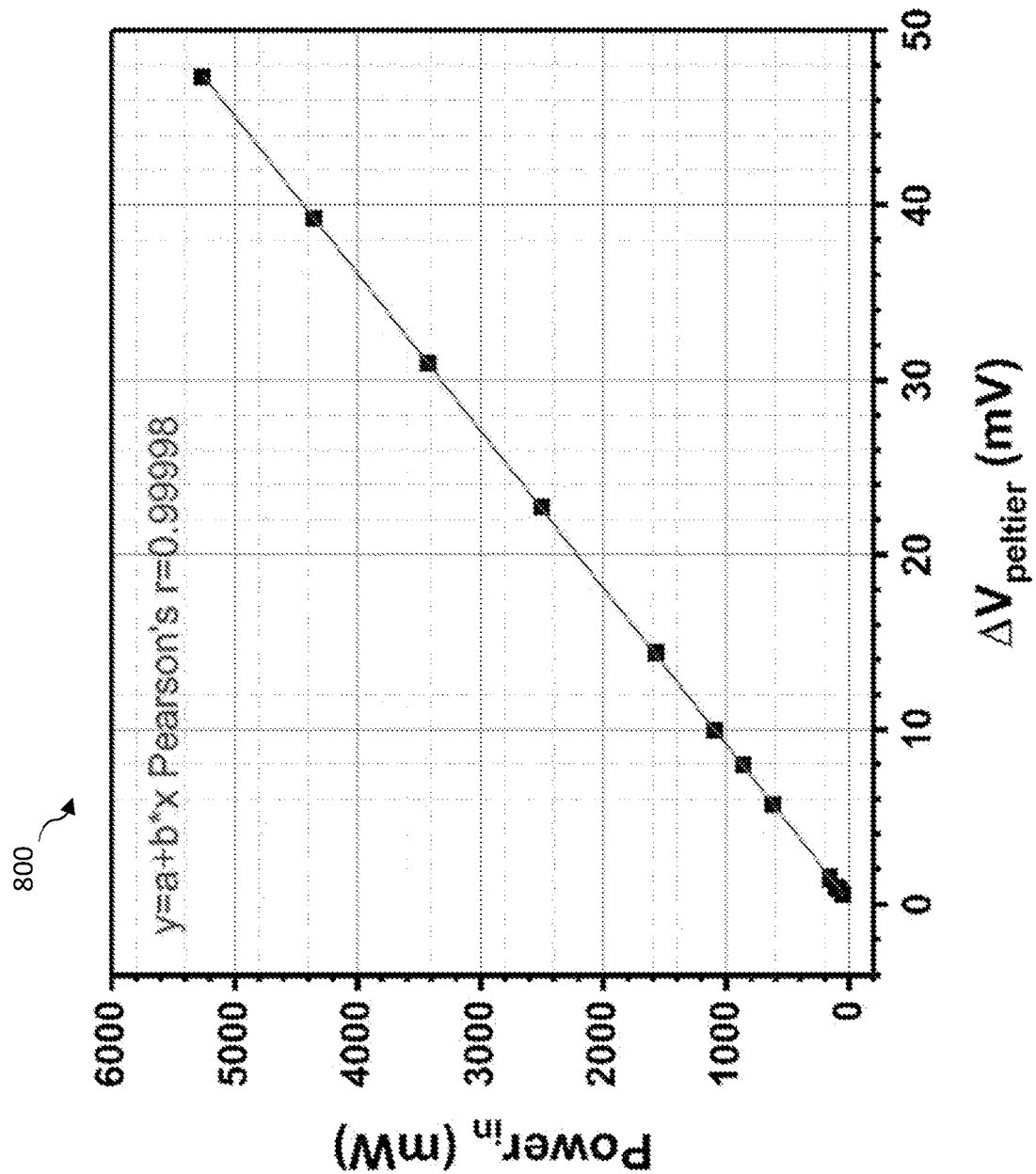
FIG. 8 depicts an exemplary calibration chart for an open calorimeter system, in accordance with the disclosed embodiments.

FIG. 8 illustrates a graph 800 of power excess as a function of input power. This graph illustrates the efficacy of the symmetry factor. Mismatched thermal pathways are dramatically mitigated with this factor applied.

Figure 9:
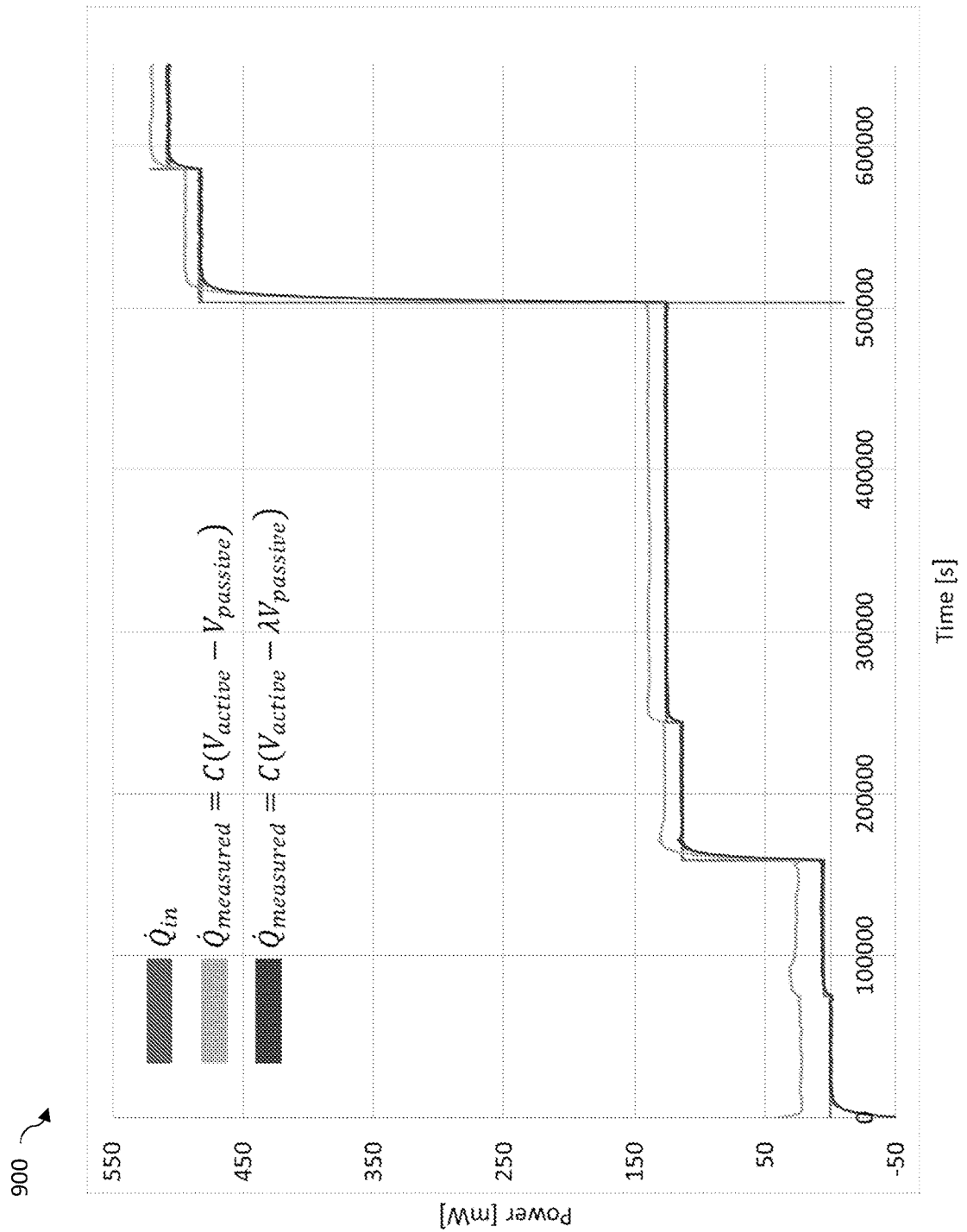
FIG. 9 depicts a power step series associated with an open calorimeter system, in accordance with the disclosed embodiments.

FIG. 9 illustrates the calorimeter's response in a normal room-temperature environment. The chart 900 illustrates several power steps applied for relatively long periods of time with each step lasting at least 24 hours. The input electrical power was stepped through approximately 5 mW, 115 mW, 125 mW, 480 mW and 505 mW, power levels. The small steps qualify the calorimeter's ability to detect small power deviations. Again, while this calorimeter is well-matched in terms of cell and sample size and mass, and the flux sensors can be chosen to have closely matched sensitivities, the symmetry factor corrects the measured output signal visibly, as can be seen by the offset and room perturbations displayed in the uncorrected signal (grey).

Figure 10:
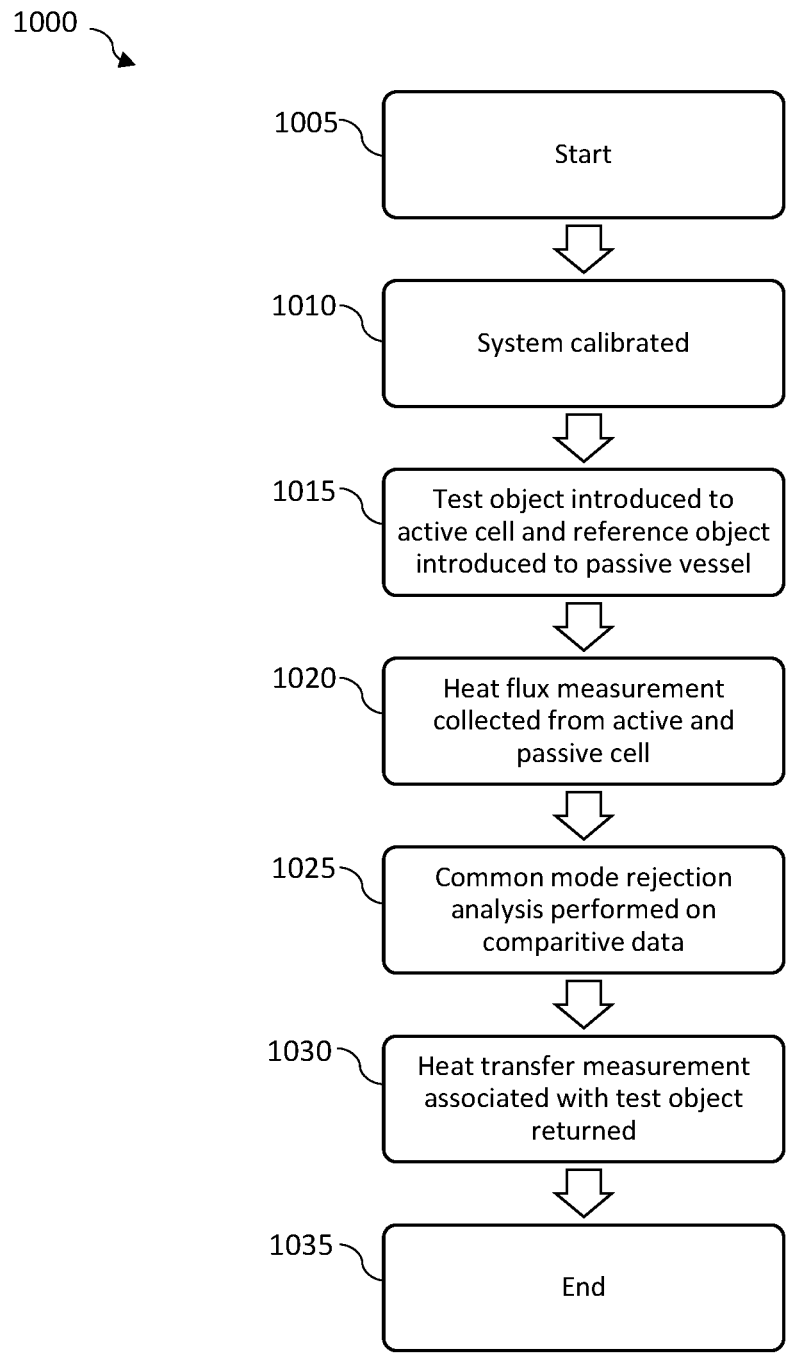
FIG. 10 depicts steps associated with a method for measuring energy using an open calorimeter system, in accordance with the disclosed embodiments.

FIG. 10 illustrates steps associated with a method 1000 for measuring heat transfer with a calorimeter system as disclosed herein. The method begins at 1005.

At step 1010 the system 400 can be calibrated with the calibration module 475. Calibration can generally include determining the correction factor and scaling factor. It should be noted that Calibration steps are arbitrary considering the experiment being calibrated for. The calibration represents the theoretical range that the user will conduct their empirical repertoire.

Next at step 1015, the test object and reference object can be added to the active and passive vessels respectively. At step 1020, testing can be initiated and heat flux measurements can be collected from the active cell and the passive cell and provided to the data acquisition module 475.

The acquired data can then be subject to a common mode rejection analysis by common mode rejection module 480, as shown at step 1025. Common mode rejection (the canceling of common heat flux sensor signals produced by environmental temperature variations) is obtained nominally by subtracting the active signal from the passive. With the variations inherent in such a system, the overall sensitivity of each container's sensor for a given energy flow are not matched. The sensor's overall sensitivity can however, be matched with a mathematical correction factor. This factor is found by measuring the signal from each sensor (with no power generated in either container) and averaging these signals over a finite time period. The averaged active signal is then divided by the averaged passive signal. This factor (S) then multiplies the passive flux sensor signal. A scaling factor (C) then multiplies the expression to obtain power out in units of Watts: Pout=C*(Active−S*Passive).

The resulting heat transfer measurement can then be provided via the output module 485, as illustrated by step 1030.

The method ends at 1035.

The disclosed technology is unique in that it allows the measurement of energy and power from an 'open' system, where a heat flux enters and leaves the calorimetric boundary in a well-controlled manner. It is also including a solid-state heating/cooling assembly that acts as an electronic heat reservoir. Additionally, the disclosed embodiments can compensate for any mismatches in heat flow between an active and a passive container and for mismatches in the sensitivities of the flux sensing elements used to measure heat flow. The system can be easily adapted to measure energy or power from experiments contained in arbitrarily shaped vessels, and it can be operated in a standard room or laboratory environment and hence it does not require a temperature-controlled environment. Finally, this system is able to operate in a typical, room-temperature environment, making it more accessible than conventional methods.

The disclosed systems and methods can be used to measure heat transfer, energy, and/or, power, for any number of test objects. Such test objects can include substances undergoing chemical or biological processes, microchips or integrated circuits, or other such objects where accurate open system measurements may be desirable.

Based on the foregoing, it can be appreciated that a number of embodiments, preferred and alternative, are disclosed herein. For example, in an embodiment, a calorimeter comprises an active vessel, a passive vessel, a first heat flux detector connected to the active vessel with a first conductor, a second heat flux detector connected to the passive vessel with a second conductor, and a thermal reservoir connected to the first heat flux detector and the second heat flux detector, wherein heat flux between the active vessel and the thermal reservoir is measured by the first heat flux detector and heat flux between the passive vessel and the thermal reservoir is measured by the second heat flux detector.

In an embodiment, the thermal reservoir comprises a cold plate and a thermoelectric module thermally connected to the cold plate and configured to maintain the cold plate at a set point temperature. In an embodiment, the thermoelectric module comprises a Peltier junction array module.

In an embodiment the calorimeter further comprises a first isothermal shield configured around the active vessel and a second isothermal shield configured around the passive vessel.

In an embodiment the calorimeter further comprises a heat sink in thermal communication with the thermal reservoir, wherein energy from the thermal reservoir is transferred between the heat sink and the thermal reservoir.

In an embodiment, the first heat flux detector comprises one of: a first heat flux sensor, a first Peltier junction array module and a thermal break comprising a resistive material across which temperature difference is measured; and the second heat flux detector comprises one of: a second heat flux sensor and a second Peltier module.

In an embodiment, the first conductor comprises a first conductive plate and the second conductor comprises a second conductive plate.

In an embodiment the calorimeter further comprises at least one heater element connected to the active vessel.

In an embodiment an open calorimetry system comprises an active vessel, a passive vessel, a first heat flux detector in thermal communication with the active vessel, a second heat flux detector in thermal communication with the passive vessel, a thermal reservoir connected to the first heat flux detector and the second heat flux detector, and a computer system, said computer system comprising: at least one processor and a computer-usable medium embodying computer program code, the computer-usable medium capable of communicating with the at least one processor, the computer program code comprising instructions executable by the at least one processor and configured for: accepting an input signal from the first heat flux detector, accepting an input signal from the second heat flux detector, applying a differential analysis on the input signal from the first heat flux detector and the input signal from the second heat flux detector, and outputting an energy measurement of an article in the active vessel.

In an embodiment, the differential analysis further comprises a Common Mode Rejection analysis of the input from the first heat flux detector and the input from the second heat flux detector.

In an embodiment, the computer system is further configured for determining a correction factor according to the input signal from the first heat flux detector and the input from the second heat flux detector. In an embodiment, the computer system is further configured for determining a scaling factor according to the input signal from the first heat flux detector and input from the second heat flux detector.

In an embodiment, the thermal reservoir comprises a cold plate and a thermoelectric module thermally connected to the cold plate configured to maintain the cold plate at a set point temperature. In an embodiment the thermoelectric module comprises a Peltier module.

In an embodiment, the open calorimetry system further comprises a heat sink in thermal communication with the thermal reservoir, wherein thermal energy from the thermal reservoir is transferred between the heat sink and the thermal reservoir.

In an embodiment the open calorimetry system further comprises: a first thermal plate connecting the first heat flux detector and the active vessel and a second thermal plate connecting the second heat flux detector and the passive vessel.

In an embodiment, an open calorimetry apparatus comprises an active vessel, a passive vessel, a first heat flux detector connected to the active vessel with a first conductor, a second heat flux detector connected to the passive vessel with a second conductor, a thermal reservoir connected to the first heat flux detector and the second heat flux detector, wherein heat flux between the active vessel and the thermal reservoir is measured by the first heat flux detector and heat flux between the passive vessel and the thermal reservoir is measured by the second heat flux detector, an active isothermal base plate covering the active vessel, and a passive isothermal base plate covering the passive vessel.

In an embodiment, the open calorimetry apparatus further comprises an insulating cover configured to fit over the active vessel and the passive vessel. In an embodiment, the open calorimetry apparatus further comprises at least one sensor configured on at least one of the active isothermal base plate and the passive isothermal base plate, the at least one sensor configured to correct for heat transfer over a surface of the active vessel and passive vessel. In an embodiment, the thermal reservoir comprises a cold plate and a thermoelectric module thermally connected to the cold plate and configured to maintain the cold plate at a set point temperature.

It will be appreciated that variations of the above-disclosed and other features and functions, or alternatives thereof, may be desirably combined into many other different systems or applications. Also, it should be appreciated that various presently unforeseen or unanticipated alternatives, modifications, variations or improvements therein may be subsequently made by those skilled in the art which are also intended to be encompassed by the following claims.

What is claimed is:

1. A calorimeter comprising:
   an active vessel;
   a passive vessel;
   a first heat flux detector connected to the active vessel with a first conductor;
   a second heat flux detector connected to the passive vessel with a second conductor; and
   a thermal reservoir connected to the first heat flux detector and the second heat flux detector, the thermal reservoir comprising:
      a cold plate comprising a Proportional-Integral-Differential (PID) controlled cold plate; and
      a thermoelectric module thermally connected to the cold plate and configured to maintain the cold plate at a set point temperature, wherein heat flux between the active vessel and the thermal reservoir is measured by the first heat flux detector and heat flux between the passive vessel and the thermal reservoir is measured by the second heat flux detector.

2. The calorimeter of claim 1 wherein the first heat flux detector comprises a thermopile; and
   the second heat flux detector comprises a thermopile.

3. The calorimeter of claim 2 wherein the thermoelectric module comprises a Peltier junction array module.

4. The calorimeter of claim 2 further comprising:
   a first isothermal shield configured around only the active vessel; and
   a second isothermal shield configured around only the passive vessel.

5. The calorimeter of claim 1 further comprising:
a heat sink in thermal communication with the thermal reservoir, wherein energy from the thermal reservoir is transferred between the heat sink and the thermal reservoir.

6. The calorimeter of claim 1 wherein:
the first heat flux detector comprises one of:
  a first heat flux sensor;
  a first Peltier junction array module; and
  a thermal break comprising a resistive material across which temperature difference is measured; and
the second heat flux detector comprises one of:
  a second heat flux sensor; and
  a second Peltier module.

7. The calorimeter of claim 1 wherein the first conductor comprises a first conductive plate and the second conductor comprises a second conductive plate.

8. The calorimeter of claim 1 further comprising:
at least one heater element connected to the active vessel.

9. An open calorimetry system comprising:
an active vessel;
a passive vessel;
a first heat flux detector in thermal communication with the active vessel;
a second heat flux detector in thermal communication with the passive vessel;
a thermal reservoir connected to the first heat flux detector and the second heat flux detector the thermal reservoir comprising:
  a cold plate comprising a Proportional-Integral-Differential (PID) controlled cold plate; and
  a thermoelectric module thermally connected to the cold plate and configured to maintain the cold plate at a set point temperature; and
a computer system, said computer system comprising:
  at least one processor; and
  a computer-usable medium embodying computer program code, the computer-usable medium capable of communicating with the at least one processor, the computer program code comprising instructions executable by the at least one processor and configured for:
    accepting an input signal from the first heat flux detector;
    accepting an input signal from the second heat flux detector;
    applying a differential analysis on the input signal from the first heat flux detector and the input signal from the second heat flux detector, the differential analysis further comprising a Common Mode Rejection analysis of the input from the first heat flux detector and the input from the second heat flux detector; and
    outputting an energy measurement of an article in the active vessel.

10. The open calorimetry system of claim 9 wherein the Common Mode Rejection analysis further comprises:
canceling of common heat flux from the signal from the first heat flux detector and the signal from the second heat flux detector produced by environmental temperature variations.

11. The open calorimetry system of claim 9 wherein the computer system is further configured for:
determining a correction factor according to the input signal from the first heat flux detector and the input from the second heat flux detector.

12. The open calorimetry system of claim 9 wherein the computer system is further configured for:
determining a scaling factor according to the input signal from the first heat flux detector and input from the second heat flux detector.

13. The open calorimetry system of claim 9 wherein the thermal reservoir comprises:
a cold plate; and
a thermoelectric module thermally connected to the cold plate configured to maintain the cold plate at a set point temperature.

14. The open calorimetry system of claim 13 wherein the thermoelectric module comprises a Peltier module.

15. The open calorimetry system of claim 9 further comprising:
a heat sink in thermal communication with the thermal reservoir, wherein thermal energy from the thermal reservoir is transferred between the heat sink and the thermal reservoir.

16. The open calorimetry system of claim 9 further comprising:
a first thermal plate connecting the first heat flux detector and the active vessel; and
a second thermal plate connecting the second heat flux detector and the passive vessel.

17. An open calorimetry apparatus comprising:
an active vessel;
a passive vessel;
a plurality of resistive elements configured along the active vessel and passive vessel;
a first heat flux detector connected to the active vessel with a first conductor;
a second heat flux detector connected to the passive vessel with a second conductor;
a thermal reservoir connected to the first heat flux detector and the second heat flux detector, the thermal reservoir comprising a cold plate and a thermoelectric module thermally connected to the cold plate and configured to maintain the cold plate at a set point temperature, wherein heat flux between the active vessel and the thermal reservoir is measured by the first heat flux detector and heat flux between the passive vessel and the thermal reservoir is measured by the second heat flux detector;
an active isothermal base plate covering the active vessel; and
a passive isothermal base plate covering the passive vessel.

18. The open calorimetry apparatus of claim 17 further comprising:
an insulating cover configured to fit over the active vessel and the passive vessel.

19. The open calorimetry apparatus of claim 17 further comprising:
at least one sensor configured on at least one of the active isothermal base plate and the passive isothermal base plate, the at least one sensor configured to correct for heat transfer over a surface of the active vessel and passive vessel.

* * * * *